HARTLEY & MOREHOUSE.
Bee Hive.
No. 31,384. Patented Feb. 12, 1861.
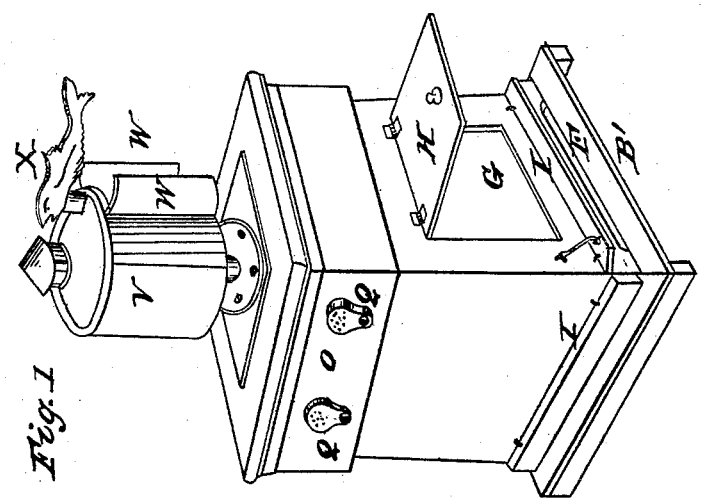
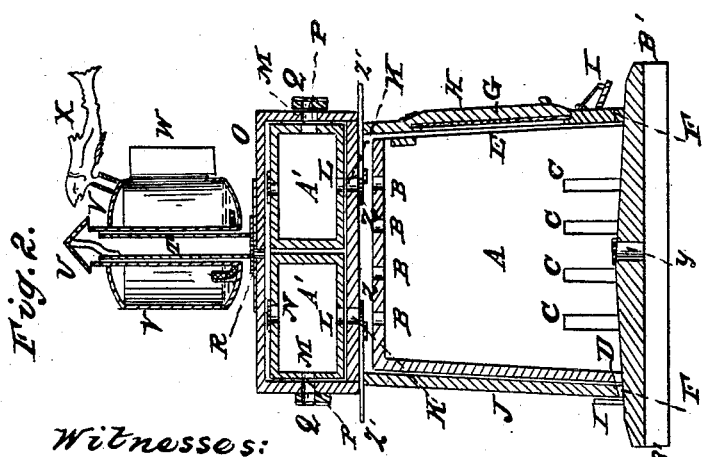

UNITED STATES PATENT OFFICE.

N. D. HARTLEY AND M. S. MOREHOUSE, OF QUINCY, ILLINOIS.

BEEHIVE.

Specification of Letters Patent No. 31,384, dated February 12, 1861.

*To all whom it may concern:*

Be it known that we, N. D. HARTLEY and M. S. MOREHOUSE, of Quincy, in the county of Adams and State of Illinois, have invented a new and useful Improvement in Beehives; and we do hereby declare that the following is a full, clear, and exact description of the same, reference being had to the accompanying drawings, forming a part of this specification, in which—

Figure 1, represents a perspective view, and Fig. 2, a central vertical section of this improved bee-hive.

Similar letters of reference, in each of the several figures indicate corresponding parts.

The nature of our invention consists in the arrangement of a chamber, slotted and perforated, box, also slotted and perforated, hives provided with perforations through the bottom and on one side, cap perforated through the top and sides, in combination with a tube, and lamp, all constructed and operating substantially as will be described.

To enable others, skilled in the art, to make and use our invention, we will proceed to describe its construction and operation.

The object of this invention is to effect a thorough ventilation through all parts of the apparatus, even when the hives are shut so as to prevent the ingress and egress of the bees, and also to attack and destroy the moth or millers.

The chamber A, has three sides and a top and bottom. It is open in front at E, so as to allow light to enter through a pane of glass G, inserted in the front of a box J, surrounding the chamber A. The pane of glass may be covered by a hinged door H. Two sides of the chamber A, are provided with vertical slots C, and the third side with a longitudinal slot D, near the chamber bottom, which latter is perforated in the center at Y. This central perforation is covered with wire gauze or similar material. The bottom of the chamber is somewhat elevated above the ground so as to allow the air to enter at B', B'. The surrounding box J is also provided with longitudinal slots F, near the chamber bottom upon which the box rests. These slots F, can be closed by means of hinged shutters I.

The top of the chamber is perforated, as seen at B, and the top of the box J, is also provided with holes K, one to each bee hive A'. These holes K, can be shut so as to prevent the ingress or egress of bees by means of wire-gauze valves Z, operated from the outside by handles Z'.

The hives A', are placed on the top of box J, so that the hole L, in the center of the bottom of each hive corresponds with one of the holes K. Each hive has a hole M, through one of its sides, and a hole N, through the top, the latter covered with wire gauze.

A cap O, is placed over the hives, so as to fit the top of box J. Holes P, in the sides of the cap, correspond with the holes M, of the hives, and can be shut by means of wire gauze valves Q. A hole R, in the center of the top of the cap is covered with wire gauze and communicates with a vertical tube or chimney T. This tube terminates at its top into a point U, which serves as support and pivot for a revolving lamp V. The lamp has an opening at one side shielded by two wings W, and has a vane X, attached to it, so as always to turn the opening from the wind and thereby protect the flame. The lamp serves to attract the moth or millers and kill them by the heat of the flame.

The bees can enter the hives through the holes P, M, or through the slots F, D, C, and holes B, K, L. At night the shutters I, and valves Z, Q, are shut so as to exclude the moths or millers and similar animals from entering the hives.

A thorough ventilation will be kept up, even when the shutters I, and valves are shut. The air enters the chamber A, through the bottom of the chamber, at Y. From the chamber, it passes through the slots C, D, at the open side E, and through the holes B, into the space between the chamber A, and box J. From here it enters the bee hive A', through holes K, L, and passes through the perforations M, N, into the space between the cap O, and hives and then, through the hole R, into and finally out of tube T. Thus it will be seen a perfect ventilation is kept up even when the shutters and valves of the apparatus are closed. Another advantage of this arrangement is that the bees have no access to the hole R, and are thereby prevented from sealing it up and stopping the ventilation.

The tube T, it will be seen is made to serve the double purpose of a chimney and a pivot for the revolving lamp.

What we claim as our invention and desire to secure by Letters Patent, is—

The arrangement of a chamber A, slotted and perforated at C, D, Y, B, box J, also slotted and perforated—as seen at F, and K,—hives A', provided with perforations L, M, N, through top, bottom, and one side, cap O, perforated at R, and P, through top and sides, in combination with a tube T, and lamp V, all constructed and operating substantially as and for the purposes set forth.

N. D. HARTLEY.
M. S. MOREHOUSE.

Witnesses:
HENRY F. JOSEPH RICKER,
WILLIAM FRANKE.